US012568889B2

(12) United States Patent
Wigdahl et al.

(10) Patent No.: US 12,568,889 B2
(45) Date of Patent: Mar. 10, 2026

(54) BEATER ROLLER CONFIGURATION IN A HARVESTER VEHICLE

(71) Applicants: Deere & Company, Moline, IL (US); Iowa State University Research Foundation, Inc., Ames, IA (US)

(72) Inventors: Jeffrey S. Wigdahl, Ames, IA (US); Jeffrey C. Askey, Boone, IA (US); Scott D. Weber, Bondurant, IA (US); Justin E. Hummel, Des Moines, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 443 days.

(21) Appl. No.: 18/118,557

(22) Filed: Mar. 7, 2023

(65) Prior Publication Data

US 2023/0413732 A1     Dec. 28, 2023

Related U.S. Application Data

(60) Provisional application No. 63/356,391, filed on Jun. 28, 2022.

(51) Int. Cl.
A01F 15/10        (2006.01)
A01D 46/08        (2006.01)
(52) U.S. Cl.
CPC ............ A01F 15/106 (2013.01); A01D 46/08 (2013.01)

(58) Field of Classification Search
CPC .... A01F 15/106; A01D 46/08; A01D 41/1208
See application file for complete search history.

(56) References Cited

U.S. PATENT DOCUMENTS

| | | | |
|---|---|---|---|
| 2016/0120126 A1* | 5/2016 | Weber | .................. A01D 46/084 |
| | | | 56/16.4 B |
| 2019/0254235 A1 | 8/2019 | Hackert et al. | |
| 2021/0282318 A1 | 9/2021 | Cracraft | |
| 2022/0030772 A1 | 2/2022 | Wallestad et al. | |

OTHER PUBLICATIONS

Turkish Search Report issued in application No. 2023/005859 dated Dec. 11, 2024, 08 pages.

* cited by examiner

*Primary Examiner* — Nicole Coy
(74) *Attorney, Agent, or Firm* — Tucker Ellis LLP

(57) ABSTRACT

One or more techniques and/or systems are disclosed for accumulating harvested crop that includes an accumulator for a harvester vehicle having a plurality of meter rollers aligned along a first axis and a plurality of beater rollers aligned along a second axis. The first axis is different than the second axis, and one roller of the plurality of beater rollers is aligned along the first axis. The one roller of the plurality of beater rollers aligned along the first axis is coupled with the plurality of beater rollers and not coupled to the plurality of meter rollers.

20 Claims, 7 Drawing Sheets

300

CONFIGURE METER ROLLERS AND BEATER ROLLERS
302

COORDINATE CONTROL OF METER ROLLERS
304

COORDINATE CONTROL OF BEATER ROLLERS
306

OPERATE BEATER ROLLERS SEPARATE FROM METER ROLLERS
308

ACCUMULATE HARVESTED COTTON
310

BEATER ROLLER CONFIGURATION IN A HARVESTER VEHICLE

CROSS-REFERENCE TO RELATED APPLICATIONS

This non-provisional application claims the benefit of and priority to U.S. Provisional Application No. 63/356,391, filed Jun. 28, 2022, the disclosure of which is hereby incorporated by reference herein in its entirety.

BACKGROUND

When harvesting crops, a harvester vehicle will often temporarily store the harvested crop in an accumulator. Once the accumulator fill level reaches a threshold, the accumulator is unloaded with the stored crop being used to form a crop module such as a bale of cotton or hay. Once the crop module reaches a predetermined size, the module is wrapped and ejected from the harvester vehicle. During the accumulation process, feeding cotton from the accumulator onto the feeder belt in an even manner and at a consistent rate is desired to prevent clumping or plugging of the harvested crop. As the speed of the accumulation process is increased, the likelihood of clumping or plugging can increase, which can result in delays due to the need to stop harvesting and clear the clump or plug.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for accumulating harvested crop at higher speed with a reduced likelihood of clumping or plugging. In one implementation, an accumulator for a harvester vehicle comprises a plurality of meter rollers aligned along a first axis and a plurality of beater rollers aligned along a second axis. The first axis is different than the second axis, and one roller of the plurality of beater rollers is aligned along the first axis. The one roller of the plurality of beater rollers aligned along the first axis is coupled with the plurality of beater rollers and decoupled from the plurality of meter rollers.

In another implementation, a harvester vehicle comprises an accumulator configured to receive a harvested crop and a module builder configured to build a module of the harvested crop. The accumulator includes a plurality of meter rollers and a plurality of beater rollers, and at least one roller of the plurality of beater rollers is a converted roller being converted from the plurality of meter rollers.

In another implementation, a method for controlling accumulation of a harvested crop comprises decoupling a roller of a plurality of meter rollers of an accumulator from other rollers of the plurality of meter rollers and configuring the roller for operation as a beater roller. The method further comprises coupling the roller to a plurality of beater rollers and controlling operation of the roller and the plurality of beater rollers separate from operation of the plurality of meter rollers to accumulate the harvested crop.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
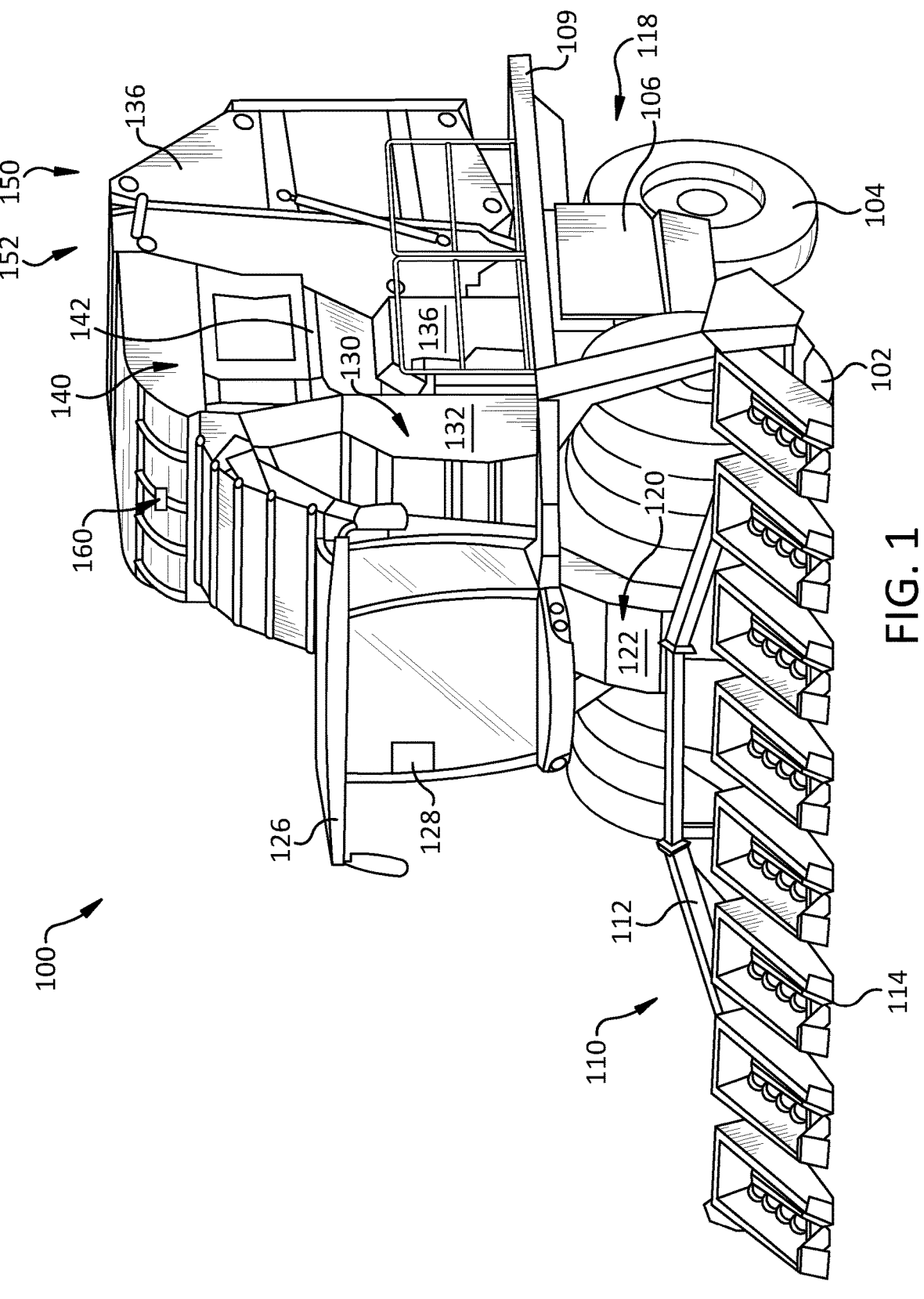
FIG. 1 is a component diagram illustrating a perspective view of a harvester vehicle according to an implementation.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different harvesters and harvesting applications. That is, the herein disclosed examples can be implemented in different harvesters other than for particular types of crops and/or harvesting systems (e.g., other than for specific farm harvester vehicles for particular harvesting applications, such as the herein described cotton harvester).

Figure 2:
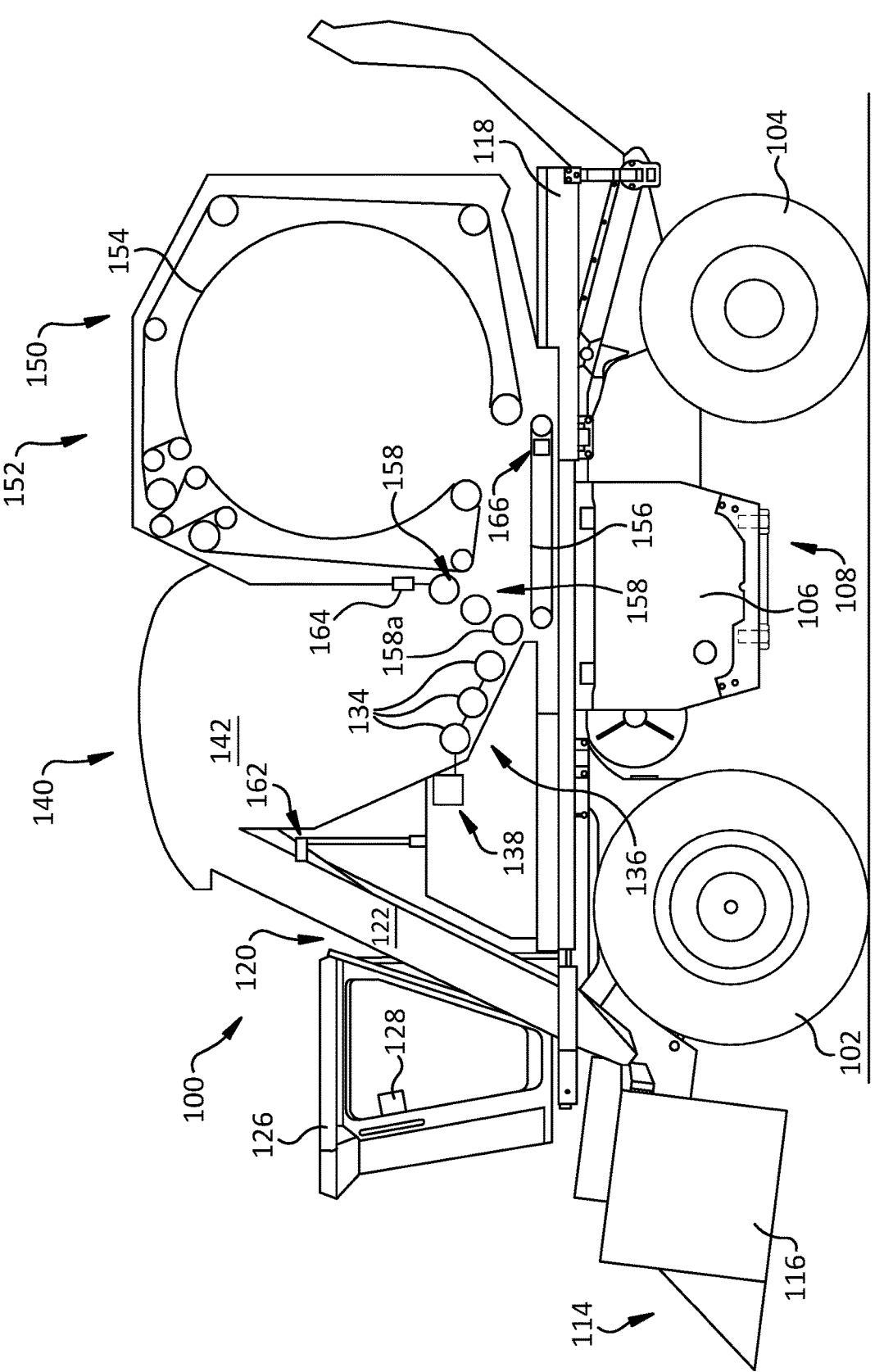
FIG. 2 is a component diagram illustrating a side view of a harvester vehicle according to an implementation.

FIGS. 1 and 2 illustrate an example harvester vehicle 100 that can utilize one or more portions of the aspects and examples described herein. In this example, the harvester vehicle 100 is a cotton harvester (e.g., cotton picker, cotton stripper), but other types of harvesters are contemplated by this disclosure, such as a combine.

The harvester vehicle 100 includes a chassis 118 that is supported by front wheels 102 and rear wheels 104, although other support is contemplated, such as tracks. A power module 108, such as an engine 106, is supported below the chassis 118 in the illustrated example. Water, lubricant, and fuel tanks (not shown) can be supported in and on the chassis 118. The harvester vehicle 100 is adapted for movement through a field to harvest crops (e.g., cotton, corn, stover, hay, wheat, alfalfa, etc.).

An operator station 126 is also supported by the chassis 118. An operator interface 128 is positioned in the operator station 126. In some examples, the operator interface 128 includes or is configured as a controller that allows for controlling the operation or setting of one or more components of the harvester vehicle 100.

A crop harvesting device 114 is coupleable to the chassis 118. The crop harvesting device 114 can be configured to remove cotton from a field in some examples. The crop harvesting device 114 in one or more examples includes a cotton stripper header 112 (see FIG. 1), one or more cotton picking units 116 (see FIG. 2), or another harvesting structure (e.g., corn head, or other crop heads). Alternatively, the crop harvesting device 114 can be configured to remove corn, or other crops. The crop harvesting device 114 has different configurations (e.g., sizes, dimensions, etc.) depending on the type of crop being harvested and the manner of removing the crop from the field. In some implementations, the harvester vehicle 100 is a cotton stripper equipped with the crop harvesting device 114 that is adapted to remove, or strip, cotton from the plant.

In some implementations, the harvester vehicle 100 includes a header system 110. The header system 110 can further include a crop header component that operably harvests a crop from a target field, a hydraulic motor or electric motor (not shown), and one or more sensors. In some implementations, the crop header component includes the cotton stripper header 112 (e.g., a cotton stripper). For implementations of the header system 110 that include a hydraulic motor, a hydraulic pump on the harvester vehicle 100 can drive the hydraulic motor on the cotton stripper header 112. In these implementations, the hydraulic motor supplies the power to rotate a shaft that drives individual harvesting units, as well as cross augers that deliver cotton to the harvester vehicle 100. In other implementations, the electric motor supplies the power to rotate a shaft that drives individual harvesting units, as well as cross augers that deliver cotton to the harvester vehicle 100.

In some implementations, the harvester vehicle 100 includes an air system 120. The air system 120 in some examples includes a crop conveyor component that conveys the crop through the harvester vehicle 100, one or more sensors 160, 162, and a crop conveyor device (e.g., one or more air ducts and an air flow generator). In some implementations, the crop conveyor component includes one or more air ducts 122.

In some implementations, the air system 120 is operably coupled to, and in communication with, the header system 110. In these implementations, the air duct 122 is coupled to, and aligned with the cotton stripper header 112, so that the cotton stripped by the cotton stripper header 112 can be transported into the harvester vehicle 100 (e.g., a cleaner) through the air ducts 122 of the air system 120 powered by air flow (e.g., an air generator).

The one or more sensors 160, 162 can be configured to monitor air flow and/or crop mass flow in the air ducts 122 of the air system 120. In some implementations, one or more of the sensors 160, 162 can be positioned in the air ducts 122. As an example, the harvester vehicle 100, configured as a cotton stripper, includes a plurality of the sensors 160 (e.g., flow sensors) that are mounted across the width of the air ducts 122. In other implementations, one or more sensors 160, 162 can be positioned adjacent the air ducts 122. As an example, the harvester vehicle 100, such as a cotton picker, includes a plurality of mass flow sensors 162 that are mounted behind the air ducts 122 with one cotton mass flow sensor mounted per row unit. The air flow, and/or crop mass flow, can be monitored using various types of sensors.

In some implementations, the harvester vehicle 100 includes a cleaner system 130. In some examples, the cleaner system 130 includes a crop cleaner component that operably cleans the harvested crop, a hydraulic motor or electric motor (not shown), and one or more sensors. In some implementations, the crop cleaner component includes a cleaner 132. The cleaner 132 is configured to clean cotton from the cotton stripper header 112 by removing trash and debris. For implementations of the cleaner system 130 that include a hydraulic motor, a hydraulic pump on the harvester vehicle 100 drives the hydraulic motor on the cleaner 132.

In some implementations, the cleaner system 130 is operably coupled to, and in communication with the header system 110 via the air system 120. In these implementations, the cleaner 132 is coupled to, and aligned with, the air duct 122 so that the cotton stripped by the cotton stripper header 112 can be transported into the cleaner 132 through the air ducts 122 of the air system 120 powered by air flow.

In some implementations, a crop receptacle 152 is coupleable to the air system 120. In one or more examples, the crop receptacle 152 is a module builder 150 having at least one baler belt 154. As an example, the module builder 150 can be used to build a module of the crop, such as a bale of cotton or hay/straw, etc. In other implementations, the crop may be ejected by the air system 120 into an internal hopper, and/or ejected from the harvester into an accompanying holding tank.

The harvester vehicle 100 further includes an accumulator system 140. The accumulator system 140 in some examples includes a crop accumulator component that operably, temporarily stores the harvested crop. In some implementations, the crop accumulator component includes an accumulator 142. The accumulator 142 is configured to receive cotton, or other crop, harvested by the cotton stripper header 112 or the cotton picking units 116.

In some implementations, the accumulator system 140 is operably coupled to, and in communication with the cleaner system 130. In these implementations, the harvested crop can be transported (e.g., powered by air flow from an air generator) from the cleaner 132 into the top of the accumulator 142 such that the accumulator 142 fills from the bottom up.

In various examples, a feeder 136 is coupleable to the chassis 118. The feeder 136 can be configured to receive cotton, or other crop, from the accumulator 142. The feeder 136 includes a plurality of meter rollers 134 configured to compress the cotton, or other crop, and transfer the cotton, or other crop, to the module builder 150 at a feed rate. A first motor 138 is positioned with respect to and operable to rotate the plurality of meter rollers 134, which in this example includes three meter rollers 134 arranged along an axis 180 (also referred to as a first axis, see FIG. 4).

A plurality of beater rollers 158 arranged along an axis 200 (also referred to as a second axis, see FIG. 6) are configured to cooperate with the plurality of meter rollers 134 to transfer the crop, such as cotton, to the module builder 150 at the feed rate. In some examples, the plurality of meter rollers 134 include three meter rollers 134 configured to control the speed of the flow to the plurality of beater rollers 158, which include three beater rollers 158 configured to de-clump or break-up the mass of cotton from the plurality of meter rollers 134. A second motor 164 is positioned with respect to and operable to rotate the plurality of beater rollers 158. That is, the plurality of beater rollers 158 are separately driven from the plurality of meter rollers 134. In some examples, the speed of rotation is thereby separately and differently controlled for the plurality of beater rollers 158 and the plurality of meter rollers 134, while all of the rollers rotate in the same direction (e.g., the plurality of beater rollers 158 and the plurality of meter rollers 134 all rotate in a clockwise direction as viewed in FIG. 2). That is, in one or more examples, the rollers of the plurality of beater rollers 158 are coupled (e.g., physically and/or operationally coupled) to one another and the rollers of the plurality of meter rollers 134 are coupled (e.g., physically and/or operationally coupled) together. As such, rotatable control of the rollers in each of the plurality of beater rollers 158 and the plurality of meter rollers 134 is accomplished in a coordinated manner (e.g., control of rotation speed).

In other examples, the rollers of the plurality of beater rollers 158 are not coupled to one another and the rollers of the plurality of meter rollers 134 are not coupled together. As such, each of the rollers of the plurality of beater rollers 158 and each of the rollers of the plurality of meter rollers 134 are separately and/or individually controllable (e.g., drive each of the mechanically decoupled rollers at the same speed or at different speeds). For example, additional motors and/or controllers can be provided in some examples to individually control rotation of each roller of the plurality of beater rollers 158 and/or each roller of the plurality of meter rollers 134. That is, one or more controlling members can be included to allow for individualized control of one or more rollers of the plurality of beater rollers 158 and/or one or more rollers of the plurality of meter rollers 134.

In one example, one of the beater rollers 158, for example the beater roller 158a, is a converted meter roller. That is, the beater roller 158a (originally configured as a meter roller) is decoupled from the plurality of meter rollers 134, such that the beater roller 158a is converted from being one of the meter rollers 134 (e.g., is configured and/or operated to perform beater operations instead of meter operations). For example, instead of being operationally coupled to the plurality of meter rollers 134, the beater roller 158a is operationally coupled to the plurality of beater rollers 158, thereby resulting in three beater rollers 158 and three meter rollers 134, instead of two beater rollers 158 and four meter rollers 134. The configuration and operation of the plurality of beater rollers 158 and the plurality of meter rollers 134, is described in more detail herein. It should be noted that in some examples where the beater roller 158a is a converted roller, the conversion does not include a change in the structural configuration of either the roller or the associated drive.

In the illustrated examples, a feeder belt 156 is configured to receive crop from the plurality of meter rollers 134 and beater rollers 158 (as a ribbon of cotton that has been de-clumped from the mass of cotton by the beater rollers 158 and that is uniform across the mat) and transfer the crop to the module builder 150 at the feed rate. A third motor 166 is positioned to rotate the feeder belt 156. That is, the movement of the feeder belt 156 is separately controllable from the movement (e.g., rotation) of the plurality of meter rollers 134 and the plurality of beater rollers 158. In various examples, the configuration of the plurality of meter rollers 134 and the plurality of beater rollers 158 allows for improved and increased throughput feeding of cotton from the accumulator 342 onto the feeder belt 156 by increasing the speed of rotation of a roller 158a (e.g., from 30 revolutions per minute (RPM) to 200+ RPM) to match the speed of rotation of the beater rollers 158b, 158c that is higher than the speed of rotation of any roller of the plurality of meter rollers 134. That is, feeding of cotton from the accumulator 342 onto the feeder belt 156 is provided in a more even and consistent rate at a higher speed that results in improved cotton baling and throughput (e.g., reduced likelihood of lumpy flow at higher flow rates). In some examples, flow from the cotton air system 320 to the accumulator 342 to the module builder 150 (e.g., round module builder) is thereby improved.

Figure 3:
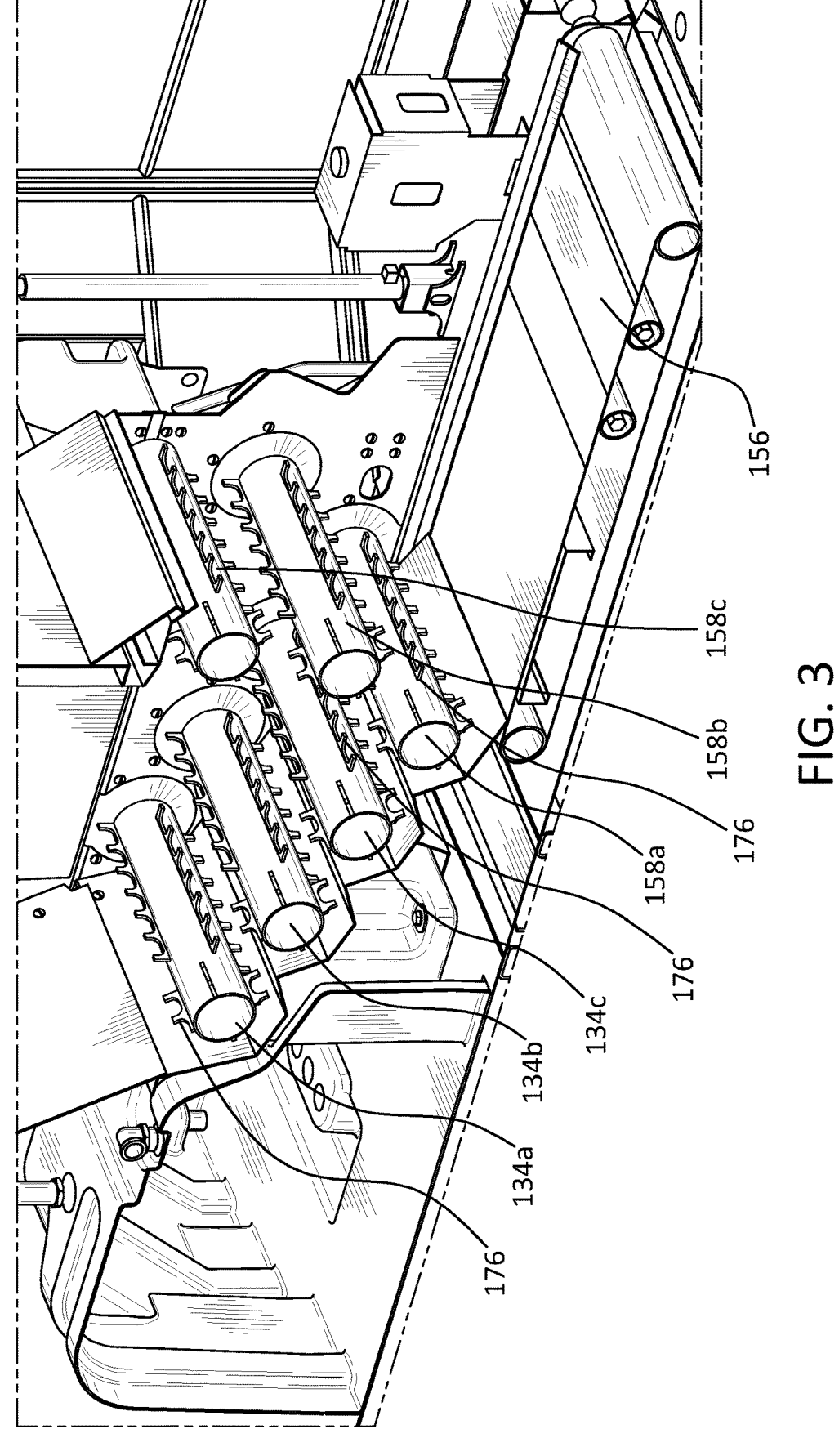
FIG. 3 is a perspective view diagram illustrating meter rollers and beater rollers according to an implementation.
Figure 4:
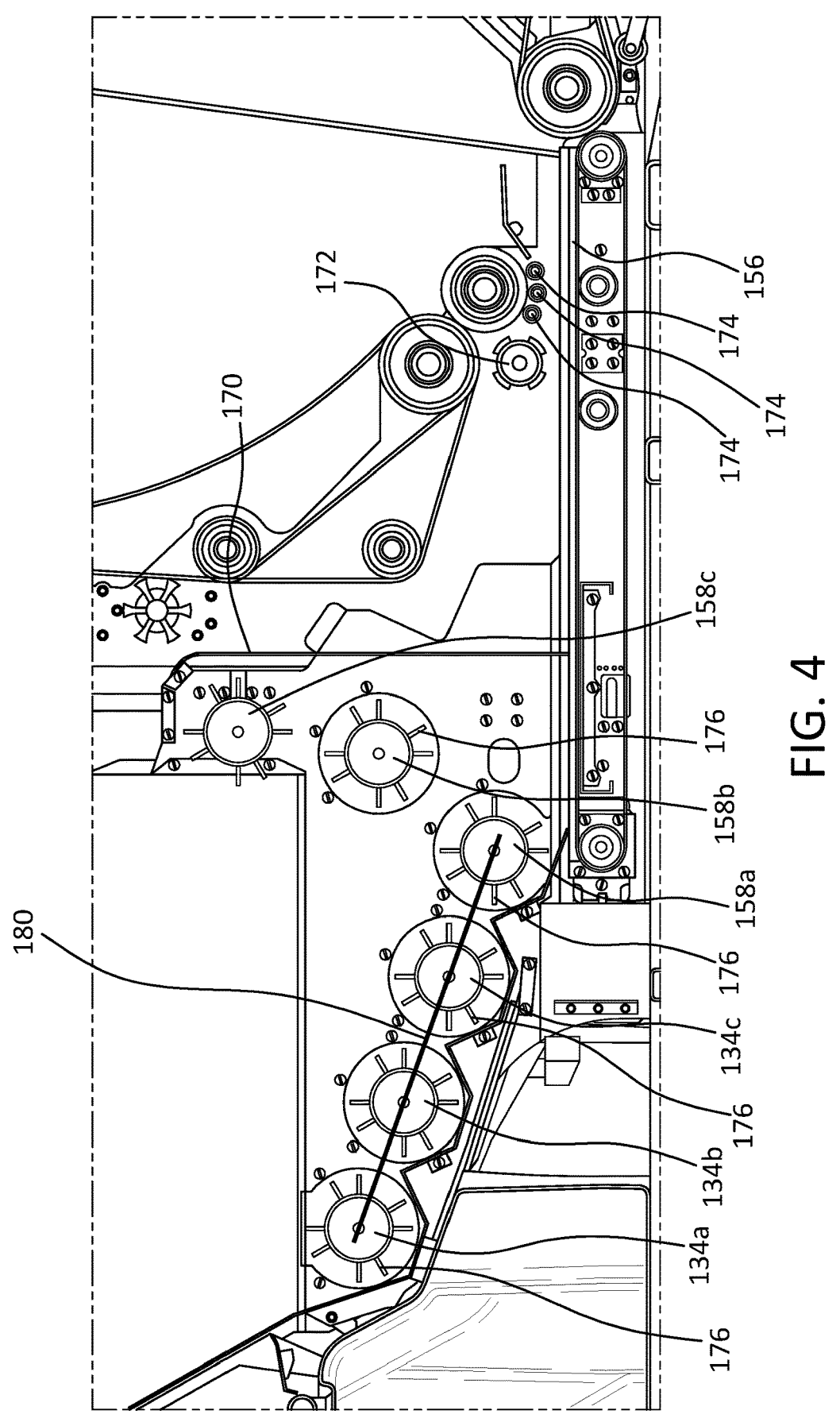
FIG. 4 is a side view diagram illustrating meter rollers and beater rollers according to an implementation.

With particular reference now to FIGS. 3 and 4, in one configuration, the plurality of meter rollers 134a, 134b, 134c and the plurality of beater rollers 158a, 158b, 158c are configured to improve accumulation of the crop at higher flow rates, for example, cotton, onto the feeder belt 156. That is, the coordinated control of three meter rollers 134a, 134b, 134c and the coordinated control of three beater rollers 158a, 158b, 158c improves flow to be more even and consistent at higher flow rates. In various examples, the flow is improved by controlling the rate of rotation of the various rollers to accept more cotton (at a higher rate), while reducing the likelihood of clumping or other adverse effects from the increased speed. In one or more roller conversion examples, the decoupling of the roller 158a from the meter rollers 134a, 134b, 134c includes physically decoupling the roller 158a from the meter rollers 134a, 134b, 134c, such that there is no physical connection or linkage between the roller 158a and the meter rollers 134a, 134b, 134c. In these examples, decoupling can also include operational or other decoupling of the roller 158a from the meter rollers 134a, 134b, 134c, such that control and/or operation of the roller 158a is independent from control and/or operation of the meter rollers 134a, 134b, 134c. For example, the meter rollers 134a, 134b, 134c are together controlled and/or operated and the roller 158a is controlled and/or operated with the beater rollers 158b, 158c, thereby being coupled to the beater rollers 158b, 158c.

In various examples, the meter rollers 134a, 134b, 134c are controlled to have increasingly slower rotations downstream, which can be accomplished, for example, by gearing or linkages between the meter rollers 134a, 134b, 134c, or by using independently controlled motors. In one example, the meter rollers 134a, 134b, 134c have rotation rates of 30 RPM, 23 RPM and 17 RPM, respectively. In another example, the meter rollers 134a, 134b, 134c have rotation rates of 60 RPM, 45 RPM and 33 RPM, respectively. However, other rotation rates are contemplated and possible. In these examples, the beater rollers 158a, 158b, 158c are configured to operate and move in combination to perform beater operations. In various examples, the plurality of beater rollers 158a, 158b, 158c each rotate at 200 RPM or 250 RPM. In some examples, the plurality of beater rollers 158a, 158b, 158c each rotate faster than the speed of rotation of the fastest rotating meter roller 134 and below a defined limit (e.g., a range that is greater than 30 RPM and less than 400 RPM). Other ranges or defined limits of rotational speed are contemplated, for example, 30 RPM to 550 RPM, 30 RPM to 600 RPM, 30 RPM to 700 RPM, or 30 RPM to 800 RPM, or other lower and/or upper limits. As should be appreciated, the rotational speed of the plurality of meter rollers 134a, 134b, 134c and the plurality of beater rollers 158a, 158b, 158c can be varied as desired or needed.

Figure 5:
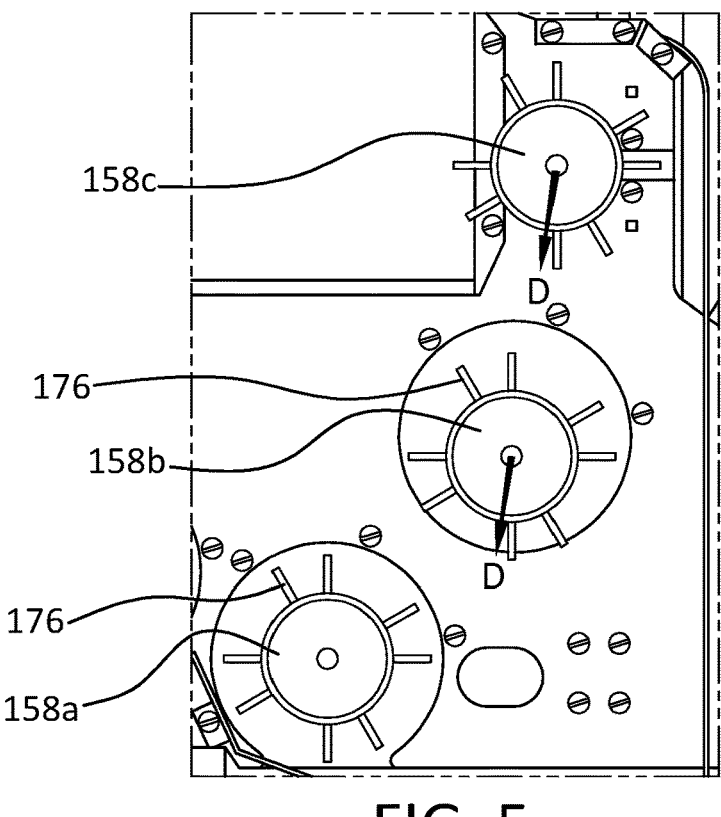
FIG. 5 is a diagram illustrating a configuration of beater rollers according to an implementation.

Additionally, as described in more detail herein, one or more characteristics, operating parameters, configurations, etc. of the plurality of beater rollers 158a, 158b, 158c can be varied to facilitate improved flow, particularly at higher speeds for increased throughput. For example, the position and/or orientation of one or more rollers of the plurality of beater rollers 158a, 158b, 158c (or other rollers) can be modified to facilitate improved flow. As illustrated in FIG. 5, in another configuration, the beater rollers 158b, 158c are in a different position (different distance or spacing than in the configuration illustrated in FIGS. 3 and 4) in relation to the beater roller 158a, such that a gap between the beater rollers 158b, 158c and a gap between the beater rollers 158a, 158b are the same. That is, in one implementation, the configuration of the plurality of beater rollers 158a, 158b, 158c includes an equal spacing between each of the rollers with the illustrated positioning of the beater rollers 158b, 158c (downward as illustrated by the D arrows as compared to the configuration in FIGS. 3 and 4) as viewed in FIG. 5 to define equally spaced apart beater rollers 158a, 158b, 158c (e.g., providing a different gap or spacing between and changing a size of a throat between the beater rollers 158a, 158b). In this configuration, similar to the configuration illustrated in FIGS. 3 and 4, the beater rollers 158a, 158b, 158c are configured to operate under a coordinated control of all three of the beater rollers 158a, 158b, 158c (e.g., rotation at the same speed). In some examples, the roller 158a is decoupled from the plurality of meter rollers 134a, 134b, 134c and coupled to the beater rollers 158b, 158c.

Figure 6:
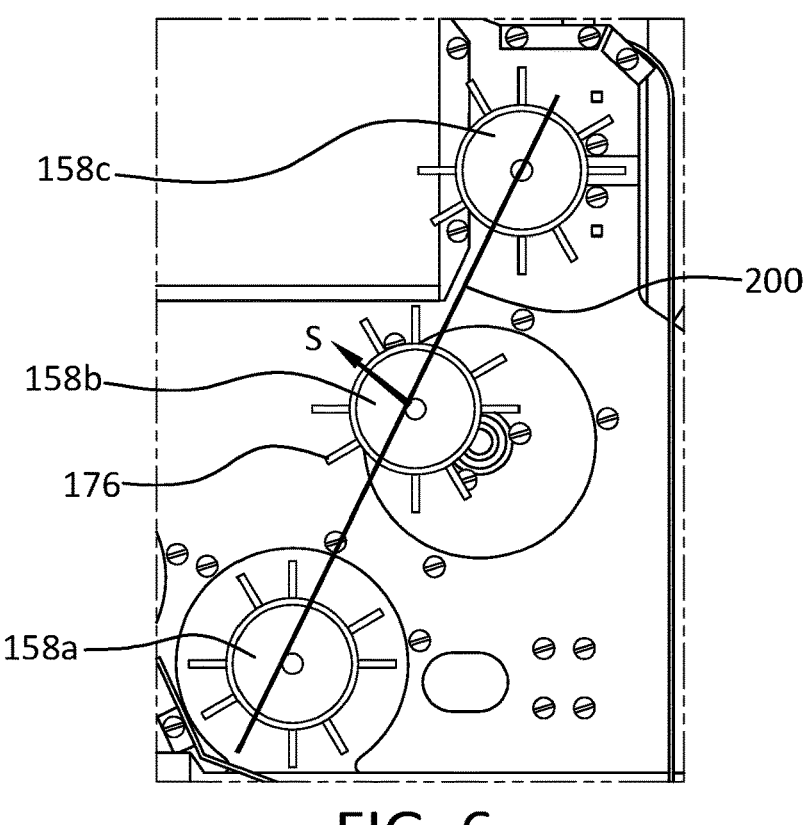
FIG. 6 is a diagram illustrating another configuration of beater rollers according to an implementation.

As illustrated in FIG. 6, in another configuration, in addition to providing the relative positioning (spacing) of the beater rollers 158b, 158c as illustrated in FIG. 5, the beater roller 158b is axially aligned with the other beater rollers 158a, 158c. That is, in one example, the beater rollers 158b, 158c are spaced apart as illustrated in FIG. 5 and the beater roller 158b is additionally aligned along a single axis with the 158a, 158c (illustrated by the S arrow showing the aligned positioned of the beater roller 158b as compared to the configuration of FIG. 5). As can be seen, in this example, the beater roller 158b is aligned with the beater rollers 158a, 158c, while maintaining the equal distance therebetween. In this configuration, the beater rollers 158a, 158b, 158c are equally spaced apart and aligned along the single axis 200. That is, the beater rollers 158a, 158b, 158c are equally spaced and positionally aligned along the single axis 200, and the plurality of meter rollers 134a, 134b, 134c and the beater roller 158a are also aligned along the single axis 180 that is different than the axis 200 (see FIG. 4), illustrated as transverse to the axis 180 and having a different slope. In some examples, the axes 180 are 200 are in different planes and transverse to one another. Thus, in various examples, centerlines of the beater rollers 158a, 158b, 158c are aligned in a same plane and/or along a same axis (single axis 200) and centerlines of the meter rollers 134a, 134b, 134c are aligned in a same plane and/or along a same axis (single axis 180). It should be noted that one or both of the axes 180, 200 can be modified (e.g., shifted or adjusted) as desired or needed.

In this configuration, the beater rollers 158a, 158b, 158c are controllable to move in unison together to facilitate improving flow of accumulated cotton in some examples. It should be noted that in some examples, the different positioning of the beater rollers 158b, 158c results in positioning of the beater rollers 158b, 158c upward or in a different direction than the D arrows illustrated in FIG. 5. As should be appreciated, different positions and/or orientations (e.g., upward/downward and forward/backward) are contemplated to provide the configured rollers as described in more detail herein.

In some examples, the beater roller 158a is not moved, but maintained in positional relationship with the meter rollers 134a, 134b, 134c (having a different spacing and aligned along a different axis). That is, while the beater roller 158a is not coupled to any of the meter rollers 134a, 134b, 134c, the beater roller 158a is spaced and axially aligned with the meter rollers 134a, 134b, 134c (and is the same physical roller element or unit that is physically and/or structurally unchanged) in some examples. In other examples, the position of the beater roller 158a is provided such that the alignment of the beater roller 158a is different with respect to the meter rollers 134a, 134b, 134c is changed. In various examples, the beater roller 158a is physically and operationally decoupled from the meter rollers 134a, 134b, 134c.

It should be noted that in some examples, the configurations shown in FIGS. 5 and 6 can be static, that is, fixed and not movable. In other examples, the configurations are adjustable, that is, dynamically changeable, such as based on one or more defined optimal settings or spacing of the beater rollers 158 (e.g., based on a type of crop being harvested). It should also be noted that the meter rollers 134 and beater rollers 158 in various examples can have different configurations (e.g., different sizes or spacing based on the type of harvester or type of crop being harvested).

Thus, a harvested crop, such as cotton, travels through the harvester vehicle 100, wherein the configuration of the beater rollers 158a, 158b, 158c in combination with the meter rollers 134a, 134b, 134c allows for improved flow, particularly at higher flow rates. In one example, in operation, with a feeder curtain 170, a laydown roller 172 (rotating in a counterclockwise direction opposite to the rotation of the beater rollers 158a, 158b, 158c and the meter rollers 134a, 134b, 134c), and guard rollers 174, the harvester vehicle 100 is configured to feed cotton in an even and consistent rate at higher speeds (e.g., accept more cotton in a time frame for a higher harvesting speed, such that material exits from the accumulator 142 faster than the material enters the accumulator 142).

In contrast to a configuration having four meter rollers 134 at the bottom of the accumulator 342 that turn at a relatively slow speed, for example, of approximately 30 RPM, and two beater rollers 158 that turn much faster, for example, at about 400 RPM, one or more examples have three meter rollers 134 and three beater rollers 158 that operate as described herein to improve flow within the accumulator 342. For example, in operation, the meter rollers 134 all turn in the same direction and move the cotton rearward toward the back of the accumulator 342 to define a first flow stream. At the lower end of the back wall of the accumulator 342, the faster turning beater rollers 158 (rotating in the same direction as the meter rollers 134), deliver cotton over the top of each and onto the feeder belt 156 to define a second flow stream. In addition to these two flow streams, a third flow stream comes between the rearmost meter roller 134c and the lowermost beater roll 158a. This third flow stream is controlled by the speed of the meter rollers 134. With the herein described configurations, the third flow stream is more consistent across the width of the feeder 136 and also along the length thereof to reduce or prevent a lumpy flow (e.g., improve the third flow stream be more even and consistent in both direction—across the width and along the length of the feeder 136) at different flow rates.

In various examples, the third flow stream is improved by one or more of:

1. Not coupling the roller 158a to the meter rollers 134 and operationally coupling the roller 158a to the beater rollers 158b, 158c to match the rotational speed of the beater rollers 158b, 158c in some examples, and exceed the speed of the beater rollers 158b, 158c in some examples. In this configuration, none of the beater rollers 158 are positionally reconfigured as described herein.
2. Providing a different spacing between the roller 158a and the beater roller 158b as described in more detail herein to have equally spaced apart beater rollers 158 to control the volume of the third flow stream. It should be noted that reducing the spacing reduces the flow rate and increasing the spacing increases the flow rate (for a constant speed). For example, with the spacing reduced while increasing the speed at the same time, the flow rate can be controlled to be the same or greater. In this configuration, an alignment adjustment, including a shifting can be used, as described in more detail herein.

It should be noted that other modifications or configurations are contemplated. For example, a spacing and/or length of one or more fingers 176 of the meter rollers 134 and/or beater rollers 158 can be changed or configured to provide a desired or required spacing or gap to define a flow rate therebetween. That is, the spacing or size of one or more fingers 176 or one or more sets of fingers 176 can be adjusted as desired or needed (e.g., to optimize a throat area between rollers). In some examples, the fingers 176 all have the same configuration (e.g., size, diameter, etc.). In other examples, some of the fingers 176 can have a different configuration than other fingers 176.

In various examples, a more consistent matt of cotton is delivered into the baler at a higher speed, and therefore a bale with better shape and higher throughput (and higher density in some examples) results. By decreasing the 'lumpiness' of the flow, the propensity of the feeder to plug is also reduced. In operation, the flow rate from the third flow stream also can be substantially increased, thereby decreasing the unload time of the accumulator 142. Thus, in some examples, the time for harvested crop to pass along the travel path of the harvester vehicle 100 is reduced.

Figure 7:
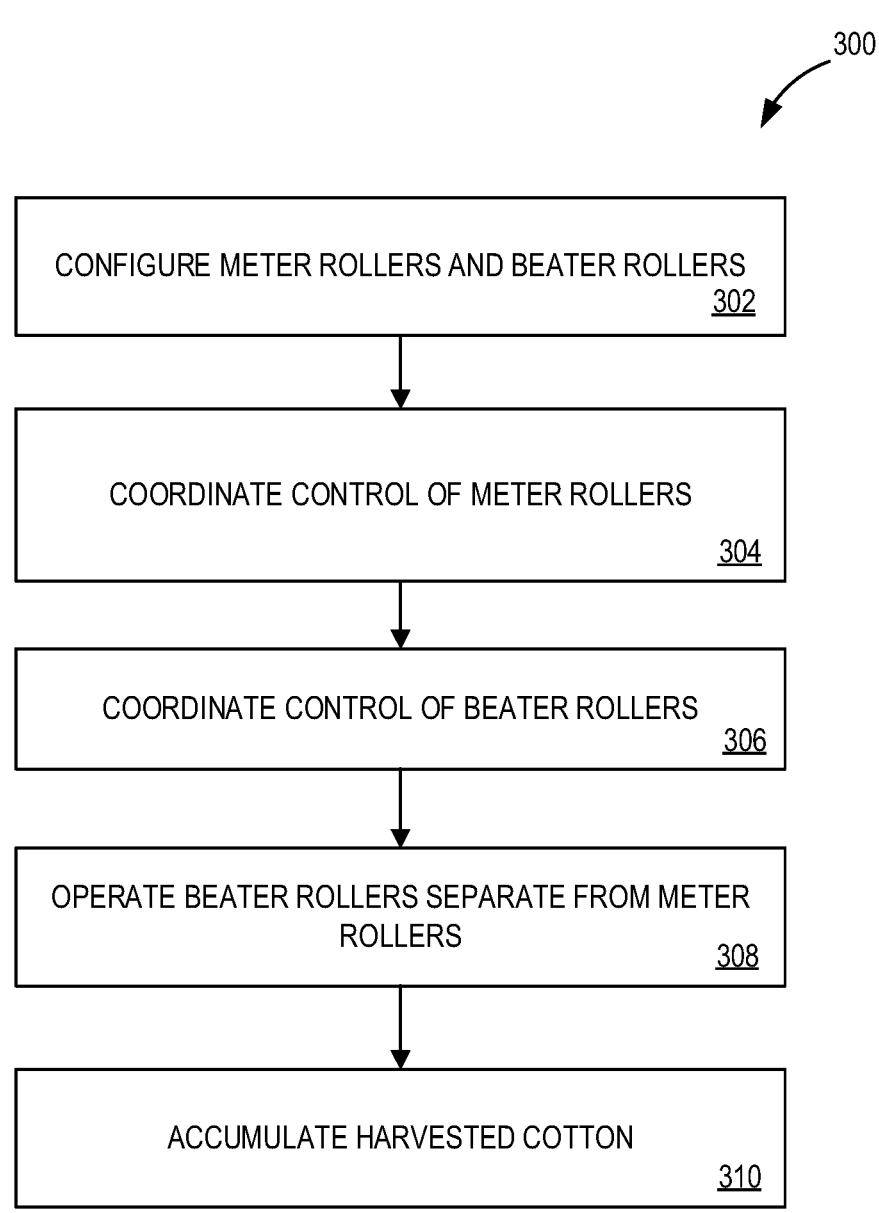
FIG. 7 illustrates an example of a method for crop accumulation according to an implementation.

An accumulator arrangement is thereby provided having improved operating capabilities. For example, three meter rollers and three beater rollers are provide to allow more even and consistent flow at higher flow rates (e.g., increased throughput rates to the module builder 150) as illustrated in the flowchart 300 of FIG. 7. That is, the flowchart 300 illustrates operations involved in configuring rollers in an accumulator to improve flow according to one implementation. In some examples, the operations of the flowchart 300 are performed using one or more configurations described in more detail herein. The flowchart 300 commences at 302, which includes configuring a plurality of meter rollers and a plurality of beater rollers. For example, a bottommost or last in flow beater roller, namely the roller 158a is coupled to the meter rollers 134. In one example, the roller 158a is physically coupled to the beater rollers 158b, 158c and physically decoupled and not linked or connected to the meter rollers 134. As such, in various examples, the accumulator 142 includes three meter rollers 134 and three beater rollers 158. In some examples, the beater roller 158a is a converted roller, converted from being a meter roller 134 to operate as a beater roller 158.

The beater rollers can be differently configured (e.g., differently positioned, oriented, and/or spaced) as described in more detail herein. For example, the configuring in various examples includes arranging or positioning three rollers for operation as a beater rollers and three rollers for operation as meter rollers. That is, three rollers, namely the beater rollers 158, perform cotton beater operations As described in more detail herein, one or more of the beater rollers in the accumulator can be positioned to align and/or be complementary with the other rollers. In operation, the configured rollers are thereby operable to perform one or more harvesting operations as described herein. For example, as described herein, the rotation of the meter rollers 134a, 134b, 134c are together controlled to perform meter operations for cotton accumulation by coupling and/or coordinating operation or control of the configured rollers at 304; and the rotation of the beater rollers 158a, 158b, 158c are together controlled to perform beater operations for cotton accumulation by coupling and/or coordinating operation or control of the configured rollers at 306. The coupling in one or more implementations includes a physical coupling together of the configured beater rollers 158 in some examples.

In the coupled configuration, wherein the beater rollers 158 are coupled and/or controlled together separate from the meter rollers 134, operation of all the beater rollers 158 is performed separate from operation of the meter rollers 134 at 308. For example, the speed of rotation of all three of the beater rollers 158 is controlled to be faster than the speed of rotation of any of the three meter rollers 134 as described in more detail herein. This allows for increased throughput with even and consistent flow to accumulate harvested cotton at 310. For example, a higher feed rate onto the feeder belt 156 with reduced likelihood of clumping is provided with one or more of the herein described implementations (e.g., prevent overloading of the system).

Thus, various examples provide improved harvester flow, including increased throughput and/or density with more even and consistent flow. As such, more cotton can be harvested and baled in a shorter period of time with less likelihood of delays due to the need to stop harvesting and clear the clump or plug in various examples.

Figure 8:
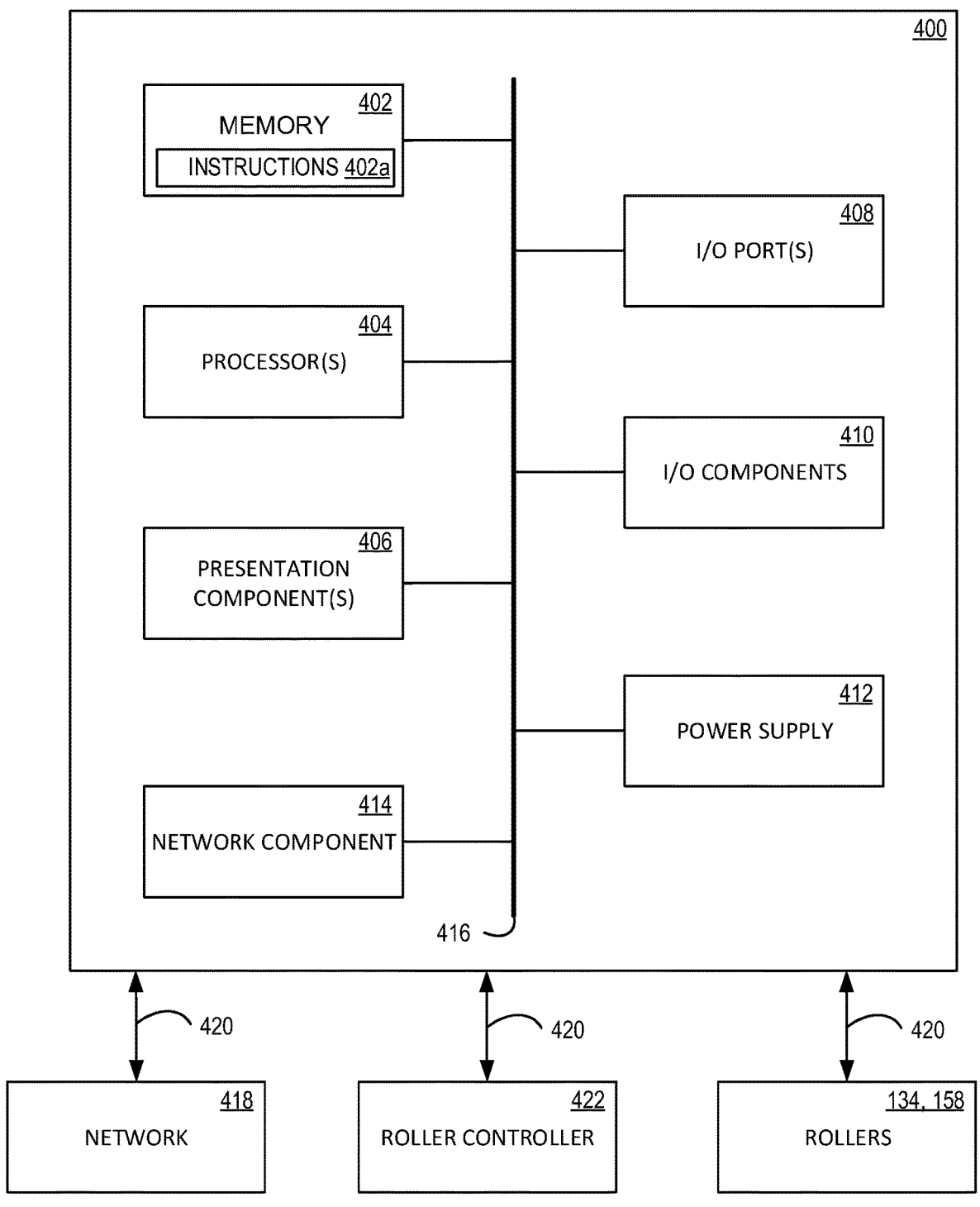
FIG. 8 is a block diagram of an example computing environment suitable for implementing various examples.

With reference now to FIG. 8, a block diagram of a computing device 400 suitable for implementing various aspects of the disclosure as described (e.g., operations or functions of the operator interface 128 or controller thereof). For example, in operation, the computing device 400 is operable with a roller controller 422 to control operation (e.g., rotation) of one or more of the meter rollers 134 and/or beater rollers 158. FIG. 8 and the following discussion provide a brief, general description of a computing environment in/on which one or more or the implementations of one or more of the methods and/or system set forth herein may be implemented. The operating environment of FIG. 8 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In some examples, the computing device 400 includes a memory 402, one or more processors 404, and one or more presentation components 406. The disclosed examples associated with the computing device 400 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 8 and the references herein to a "computing device." The disclosed examples are also practiced in distributed computing environments, where tasks are performed by remote-processing devices that are linked through a communications network. Further, while the computing device 400 is depicted as a single device, in one example, multiple computing devices work together and share the depicted device resources. For instance, in one example, the memory 402 is distributed across multiple devices, the processor(s) 404 provided are housed on different devices, and so on.

In one example, the memory 402 includes any of the computer-readable media discussed herein. In one example, the memory 402 is used to store and access instructions 402a configured to carry out the various operations disclosed herein. In some examples, the memory 402 includes computer storage media in the form of volatile and/or nonvolatile memory, removable or non-removable memory, data disks in virtual environments, or a combination thereof. In one example, the processor(s) 404 includes any quantity of processing units that read data from various entities, such as the memory 402 or input/output (I/O) components 410. Specifically, the processor(s) 404 are programmed to execute computer-executable instructions for implementing aspects of the disclosure. In one example, the instructions 402a are performed by the processor 404, by multiple processors within the computing device 400, or by a processor external to the computing device 400. In some examples, the processor(s) 404 are programmed to execute instructions such as those illustrated in the flow charts discussed herein and depicted in the accompanying drawings.

In other implementations, the computing device 400 may include additional features and/or functionality. For example, the computing device 400 may also include additional storage (e.g., removable and/or non-removable) including, but not limited to, magnetic storage, optical storage, and the like. Such additional storage is illustrated in FIG. 8 by the memory 402. In one implementation, computer readable instructions to implement one or more implementations provided herein may be in the memory 402 as described herein. The memory 402 may also store other computer readable instructions to implement an operating system, an application program and the like. Computer readable instructions may be loaded in the memory 402 for execution by the processor(s) 404, for example.

The presentation component(s) 406 present data indications to an operator or to another device. In one example, the presentation components 406 include a display device, speaker, printing component, vibrating component, etc. One skilled in the art will understand and appreciate that computer data is presented in a number of ways, such as visually in a graphical user interface (GUI), audibly through speakers, wirelessly between the computing device 400, across a wired connection, or in other ways. In one example, the presentation component(s) 406 are not used when processes and operations are sufficiently automated that a need for human interaction is lessened or not needed. I/O ports 408 allow the computing device 400 to be logically coupled to other devices including the I/O components 410, some of which is built in. Implementations of the I/O components 410 include, for example but without limitation, a microphone, keyboard, mouse, joystick, pen, game pad, satellite dish, scanner, printer, wireless device, camera, etc.

The computing device 400 includes a bus 416 that directly or indirectly couples the following devices: the memory 402, the one or more processors 404, the one or more presentation components 406, the input/output (I/O) ports 408, the I/O components 410, a power supply 412, and a network component 414. The computing device 700 should not be interpreted as having any dependency or requirement related to any single component or combination of components illustrated therein. The bus 416 represents one or more busses (such as an address bus, data bus, or a combination thereof). Although the various blocks of FIG. 8 are shown with lines for the sake of clarity, some implementations blur functionality over various different components described herein.

The components of the computing device 400 may be connected by various interconnects. Such interconnects may include a Peripheral Component Interconnect (PCI), such as PCI Express, a Universal Serial Bus (USB), firewire (IEEE 1394), an optical bus structure, and the like. In another implementation, components of the computing device 400 may be interconnected by a network. For example, the memory 402 may be comprised of multiple physical memory units located in different physical locations interconnected by a network.

In some examples, the computing device 400 is communicatively coupled to a network 418 using the network component 414. In some examples, the network component 414 includes a network interface card and/or computer-executable instructions (e.g., a driver) for operating the network interface card. In one example, communication between the computing device 400 and other devices occurs using any protocol or mechanism over a wired or wireless connection 420. In some examples, the network component 414 is operable to communicate data over public, private, or hybrid (public and private) connections using a transfer protocol, between devices wirelessly using short range communication technologies (e.g., near-field communication (NFC), Bluetooth® branded communications, or the like), or a combination thereof.

The connection 420 may include, but is not limited to, a modem, a Network Interface Card (NIC), an integrated network interface, a radio frequency transmitter/receiver, an infrared port, a USB connection or other interfaces for connecting the computing device 400 to other computing devices. The connection 420 may transmit and/or receive communication media.

Although described in connection with the computing device 400, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure, such as controllers or monitors, are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. An accumulator for a harvester vehicle, the accumulator comprising:
   a plurality of meter rollers aligned along a first axis; and
   a plurality of beater rollers aligned along a second axis, the first axis being different than the second axis, and one roller of the plurality of beater rollers being aligned along the first axis, wherein
   the one roller of the plurality of beater rollers aligned along the first axis is coupled with the plurality of beater rollers and not coupled to the plurality of meter rollers.

2. The accumulator of claim 1, wherein the one roller of the plurality of beater rollers aligned along the first axis is not physically coupled to the plurality of meter rollers.

3. The accumulator or claim 1, wherein the one roller of the plurality of beater rollers that is aligned along the first axis is a lowermost roller.

4. The accumulator of claim 1, wherein the one roller of the plurality of beater rollers that is aligned along the first axis is a converted roller converted from a meter roller to a beater roller.

5. The accumulator of claim 4, wherein the converted roller is not changed in structure.

6. The accumulator of claim 1, wherein the plurality of meter rollers includes three meter rollers and the plurality of beater rollers includes three beater rollers, and a speed of rotation of each of the three beater rollers is in a range of 30 RPM to 700 RPM.

7. The accumulator of claim 1, wherein a first spacing between each roller of the plurality of beater rollers is equal, wherein a second spacing between each roller of the plurality of meter rollers is equal, and wherein the first spacing is different than the second spacing.

8. The accumulator of claim 1, wherein the first axis is in a first plane and the second axis is in a second plane, and the first plane is transverse to the second plane.

9. The accumulator of claim 1, wherein the plurality of meter rollers rotate at a first speed and the plurality of beater rollers rotate at a second speed, wherein the first speed is different than the second speed, and wherein the plurality of meter rollers and the plurality of beater rollers rotate in a same direction.

10. The accumulator of claim 1, wherein the plurality of beater rollers are configured to cooperate with the plurality of meter rollers to transfer a crop to a module builder at a feed rate, wherein the crop is cotton, and wherein the plurality of meter rollers are individually controllable to control a speed of a flow of a mass of cotton to the plurality of beater rollers that are individually controllable to de-clump or break-up the mass of cotton from the plurality of meter rollers, and wherein a configuration of the plurality of meter rollers is based at least in part on the feed rate.

11. A harvester vehicle comprising:
   an accumulator configured to receive a harvested crop, the accumulator including three meter rollers and three beater rollers, the three meter rollers and one of the three beater rollers being aligned along a first axis, the three meter rollers having a speed of rotation less than or equal to 60 RPM, and the one roller of the three beater rollers that is aligned along the first axis has a speed of rotation greater than or equal to 200 RPM;
   a module builder configured to build a module of the harvested crop; and
   a controller configured to coordinate control of the three meter rollers and coordinate control of the three beater rollers, wherein control of the three meter rollers is separate from control of the three beater rollers.

12. The harvester vehicle of claim 11, wherein the three meter rollers are coupled together and the three beater rollers are coupled together.

13. The harvester vehicle of claim 12, wherein the coupling is a physical coupling.

14. The harvester vehicle of claim 11, wherein the three beater rollers are aligned along a second axis, the first axis being different than the second axis.

15. The harvester vehicle of claim 11, wherein the one roller of the three beater rollers that is aligned along the first axis is coupled with the other two rollers of the three beater rollers and not coupled to the three meter rollers.

16. A method for controlling accumulation of a harvested crop, the method comprising:
   configuring a plurality of meter rollers to be aligned along a first axis;
   configuring a plurality of beater rollers to be aligned along a second axis, the first axis being different than the second axis, and one roller of the plurality of beater rollers being aligned along the first axis, wherein the one roller of the plurality of beater rollers aligned along the first axis is coupled with the plurality of beater rollers and not coupled to the plurality of meter rollers; and
   controlling operation of the plurality of beater rollers separate from operation of the plurality of meter rollers to accumulate the harvested crop.

17. The method of claim 16, further comprising at least one of:

rotating the plurality of beater rollers at a speed faster than a speed of any of the plurality of meter rollers; and adjusting one of an angle or distance between one or more rollers of the plurality of beater rollers to coordinate beater operation of the plurality of beater rollers.

18. The method of claim 16, further comprising configuring the one roller of the plurality of beater rollers that is aligned along the first axis to be a lowermost roller.

19. The method of claim 16, wherein the first axis is in a first plane and the second axis is in a second plane, and the first plane is transverse to the second plane.

20. The method of claim 16, wherein the plurality of beater rollers includes three rollers and the plurality of beater rollers includes three beater rollers, and a speed of rotation of each of the three beater rollers is in a range of 30 RPM to 700 RPM.

\* \* \* \* \*